June 3, 1924.

C. W. JORDAN

LIFTER FOR PIE PANS AND THE LIKE

Filed June 2, 1923

1,496,643

Inventor
Charles W. Jordan
By Chas. C. Gillman
Atty.

Patented June 3, 1924.

1,496,643

UNITED STATES PATENT OFFICE.

CHARLES W. JORDAN, OF CHICAGO, ILLINOIS.

LIFTER FOR PIE PANS AND THE LIKE.

Application filed June 2, 1923. Serial No. 643,076.

*To all whom it may concern:*

Be it known that I, CHARLES W. JORDAN, a citizen of the United States, residing at Chicago, in the county of Cook and State of Illinois, have invented certain new and useful Improvements in a Lifter for Pie Pans and the like, of which the following is a specification.

This invention relates, generally, to improvements in lifting devices, and particularly to such devices designed for use in handling, moving and lifting culinary or kitchen utensils, such as pie pans, casseroles, sauce pans, and the like, especially when they are hot or soiled, to protect the hands from burns and soil, and it consists in certain peculiarities of the construction, novel arrangement and combination of the various parts thereof as will be hereinafter more fully set forth and specifically claimed.

The principal object of the invention is to provide a lifter of the above named character, which shall be simple and inexpensive in construction, strong, durable, and efficient in operation, with its parts so made and co-operating with one another as to be adapted for use on vessels or utensils of different diameters and heights by means of which a hot pan or vessel may be lifted either from the top of the stove or from the oven, or if desired, the position of a pan within an oven can be readily changed thereby.

Another object of the invention is the provision of a lifter of such construction that it will grasp the pan or vessel at diametrically opposite sides thereof in such a way that the pan or vessel can be moved in a manner to prevent it being tilted, thereby obviating the possibility of spilling juices or liquids therefrom.

A further object of the invention is to provide a device of the class described, which shall be of such construction that the frame-like body of the device will be, when in use for lifting a pan, disposed at a distance above the upper surface of the pan or vessel to such an extent as to prevent interference with the upper surface of the pie or dish of food being cooked in the utensil.

Other objects and advantages of the invention will be disclosed in the following description and explanation.

In the accompanying drawing, which serves to illustrate an embodiment of the invention,—

Corresponding numerals of reference refer to like parts throughout the different views of the drawing.

Figure 1:
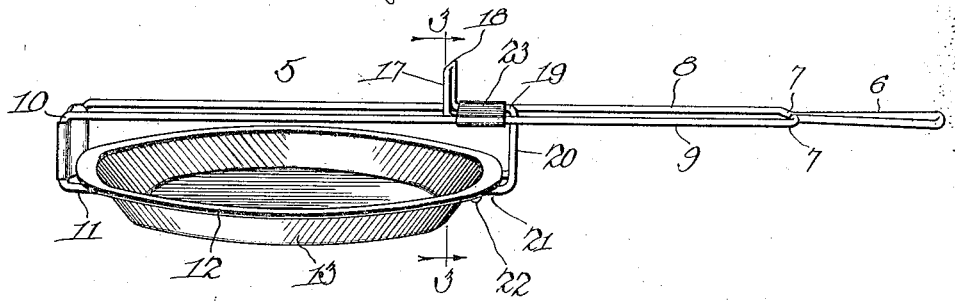
Fig. 1 is a perspective view of a lifter embodying the invention, showing it in about the position its parts will assume when lifting or moving a pie pan or similar utensil.

Referring now more particularly to Fig. 1 of the drawing, it will be seen and readily understood that the body of the device, which body is designated as a whole by the reference numeral 5, is of an elongated frame-like form and is by preference made of a single piece of heavy wire or rod material bent at about its middle to form an elongated loop or handle 6 the members of which loop or handle are approximated at their inner ends and form said points. Each member of the body is provided with an outwardly or laterally extended bent portion 7, from which latter points the members of the body 5 are extended longitudinally with respect to the handle 6 and in parallelism with one another yet at a slight distance apart, thus providing the pair of supporting members 8 and 9 of the body. Each of these members is provided at its front end with a down-turned portion 10 which terminate at their lower ends in in-turned extensions or fingers 11 which are adapted for engagement with the lower surface of the outwardly extended flange or rim 12 on the top of the pan or vessel 13 with which flanges culinary utensils of the class to which my invention is applicable for use are usually provided, and also for contact with the wall of the pan or vessel.

Figure 2:
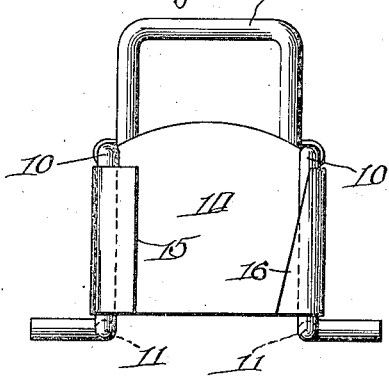
Fig. 2 is a greatly enlarged face view looking at the front end of the lifter or that end thereof opposite the handle portion of the implement.

The downwardly extended portions 10 of the members 8 and 9 of the frame-like body are united transversely by means of a clip 14, by preference made of sheet metal and having at one of its vertical edges an inturned flange 15 to embrace one of the downwardly extended portions 10 and at its other vertical edge with a similarly disposed flange 16 for engagement with the other portion 10 of the frame. This last named flange, as is clearly shown in Fig. 2 of the drawing, is cut away diagonally as shown in Fig. 2, so as to provide a much narrower portion of said flange at its upper end than at its lower end.

By this arrangement it is manifest that simple and efficient means for connecting the portions 10 of the body together transversely is afforded, for it will be understood that by hooking the flange 15 over one of the members 10 and placing the clip 14 between said member and the other member 10, the flange 16 can be caused to engage the last named member by moving the lower portion of said last named member towards the other member 10, when it is obvious that the flange 16 can be hooked over the thus inclined member, when by releasing said member, it will assume a vertical position between the flange and clip and be securely retained in such position.

Figure 3:
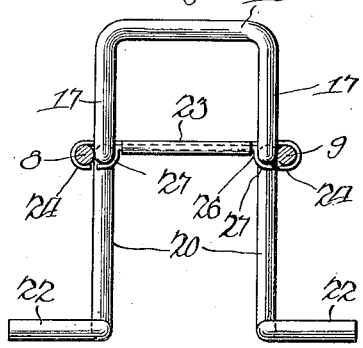
Fig. 3 is a greatly enlarged vertical sectional view taken on line 3—3 of Fig. 1 looking in the direction indicated by the arrows.
Figure 4:
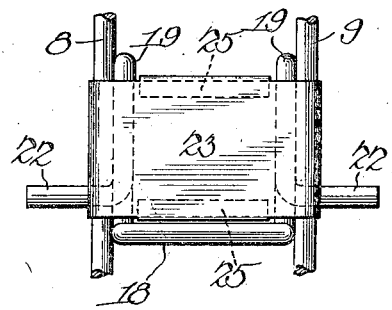
Fig. 4 is a plan view of a portion of the frame-like body of the lifter showing the slidable clamp or gripping member for the pan or cooking utensil mounted thereon.

Mounted on the parallel members 8 and 9 of the body is a movable clamp or gripping device which comprises a rod or wire bent to form substantially an inverted U-shaped member when viewed from the front end of the lifter as is clearly shown in Fig. 3 of the drawing, and has its side members or prongs 17 spaced sufficiently to fit snugly between the parallel members 8 and 9 of the body of the device. As shown in Figs. 1 and 4, the prongs 17 of this gripping member are offset from the upper or looped portion 18 as at 19, so as to lie in parallelism with the members 8 and 9 of the body 5 and extend along the members 8 and 9 a short distance and are then bent downwardly, thus forming projections 20 which depend from the body 5 about the same distance or extent as the portions 10 on the front end of the body. Each of these downwardly extended portions 20 is provided with a forwardly and horizontally extended part 21, each of which last named parts terminate in lateral extensions 22 as will be readily understood by reference to Figs. 1 and 3 of the drawing.

In order to slidably mount this gripping member on the members 8 and 9 of the body of the device, a clip 23 having at each of its side edges a hooked flange 24 to engage the members 8 and 9, is placed cross-wise of said members. The clip 23 is provided at its front edge, as well as at its rear edge, with a downwardly and in-turned flange 25 which are adapted to engage a clip 26 which underlies the clip 23 and is provided at each of its side edges with a flange 27 for engagement with the horizontally disposed portions 19 of the clamping or gripping member. By the above named arrangement it is manifest that the gripping or clamping member can be slid back and forth on the body 5 in such a way as to cause the lateral extensions 22 of the depending projections 20 to engage the lower surface of the rim or flange 12 of the pan 13 and that as these extensions are laterally disposed, they will form a very secure and reliable rest for the rim or flange of the pan, thus preventing possibility of the same tilting.

By providing the device with the downwardly extended portions 10 and 20, it is manifest that when the parts are in the positions shown in Fig. 1 ready for lifting or moving a pan, the body 5 of the device will be located at a sufficient distance above the top of the contents of the pan as not to interfere with the same, although it may have risen considerably in the process of cooking.

By providing the device with the movable gripping or clamping member constructed as above described, it is apparent that the looped portion 18 of said member will afford means by which the gripping member can be slid back and forth into and out of engagement with a pan or vessel, and also that said loop will afford means to be grasped by one hand while the handle 6 is held by the other hand in lifting the pan or vessel.

By making the body 5 of an elongated shape and of any desired length, the device is rendered very useful and convenient for shifting the position of pans in an oven or for removing them from the rear portion of the oven, as it will be understood that the movable gripping member can be slid towards the handle portion 6 of the body and so held until the body 5 is inserted into the oven to the requisite extent, when the extensions or fingers 11 on the front end of the body can be placed under the flange 12 at the point thereof furthest from the operator, when by releasing and sliding the movable gripping member towards the pan and causing its parts 21 and 22 to engage the flange of the pan at a point nearest the operator, the pan can be readily lifted from one place to another or removed from the oven.

Having thus fully described my invention, what I claim as new and desire to secure by Letters Patent is:—

In a device of the class described, the combination with an elongated frame comprising a pair of parallel members united at one of their ends by a longitudinally extended loop to provide a handle and each having at its other end a down-turned portion each terminating in a rearwardly disposed extension, a clip transversely uniting said down-turned portions below said parallel members, of a gripping member slidably mounted on and between said parallel members and comprising a substantially inverted U-shaped single piece of material having between its ends offset portions to lie along said parallel members clips transversely uniting said parallel members and said offset portions, a portion of said gripping member extended above the parallel members for furnishing means for its movement back and forth, said gripping member also having portions extending downwardly from the parallel members, each of said portions terminating at its lower end in forward and lateral extensions for engagement with the vessel substantially opposite the points of engagement by the first named engaging means.

CHARLES W. JORDAN.